United States Patent
Hellenbroich

(10) Patent No.: US 8,979,693 B2
(45) Date of Patent: Mar. 17, 2015

(54) METHOD FOR THE OPERATION OF A HYBRID DRIVE SYSTEM AND HYBRID DRIVE SYSTEM COMPRISING TWO SUB-TRANSMISSIONS

(75) Inventor: Gereon Hellenbroich, Aachen (DE)

(73) Assignee: FEV GmbH, Aachen (DE)

( * ) Notice: Subject to any disclaimer, the term of this patent is extended or adjusted under 35 U.S.C. 154(b) by 1263 days.

(21) Appl. No.: 12/600,059

(22) PCT Filed: Aug. 25, 2007

(86) PCT No.: PCT/EP2007/007471
§ 371 (c)(1),
(2), (4) Date: Nov. 13, 2009

(87) PCT Pub. No.: WO2008/138387
PCT Pub. Date: Nov. 20, 2008

(65) Prior Publication Data
US 2010/0311540 A1 Dec. 9, 2010

(30) Foreign Application Priority Data

May 14, 2007 (DE) .......................... 10 2007 022 914

(51) Int. Cl.
| | | |
|---|---|---|
| *F16H 3/72* | (2006.01) | |
| *B60K 6/40* | (2007.10) | |
| *B60K 6/48* | (2007.10) | |
| *B60K 6/547* | (2007.10) | |
| *F16H 3/091* | (2006.01) | |
| *F16H 37/06* | (2006.01) | |
| *F16H 3/08* | (2006.01) | |

(52) U.S. Cl.
CPC ... *B60K 6/40* (2013.01); *B60K 6/48* (2013.01); *B60K 6/547* (2013.01); *F16H 3/091* (2013.01); *F16H 37/065* (2013.01); *F16H 2003/0826* (2013.01); *F16H 2200/0056* (2013.01); *Y02T 10/6221* (2013.01); *B60K 2006/4841* (2013.01)
USPC .................................... 475/5; 74/340; 74/331

(58) Field of Classification Search
USPC ......................................... 74/331, 340; 475/5
See application file for complete search history.

(56) References Cited

U.S. PATENT DOCUMENTS

| | | | |
|---|---|---|---|
| 6,634,247 B2 * | 10/2003 | Pels et al. .......................... | 74/329 |
| 2002/0070818 A1 * | 6/2002 | Kim et al. ..................... | 332/106 |
| 2005/0101432 A1 | 5/2005 | Pels et al. | |
| 2006/0117882 A1 * | 6/2006 | Gitt ................................ | 74/340 |

FOREIGN PATENT DOCUMENTS

| | | | |
|---|---|---|---|
| EP | 1270301 A2 | 1/2003 | |
| EP | 1504946 A2 | 2/2005 | |

* cited by examiner

*Primary Examiner* — Derek D Knight
(74) *Attorney, Agent, or Firm* — Gifford, Krass, Sprinkle, Anderson & Citkowski, P.C.

(57) ABSTRACT

A method for the operation of a hybrid drive system is provided. The hybrid drive system has a first drive machine, for example an internal combustion engine, and a second drive machine, such as an electric machine. The hybrid drive system can also have a first gearshift sub-transmission and a second gearshift sub-transmission. The first gearshift sub-transmission can have a first input shaft that can be coupled to an output shaft using a first group of shifting gearwheel pairs, and the first input shaft can be coupled to the first drive machine. The second gearshift sub-transmission can have a second input shaft that is coupled to the output shaft using a second group of shifting gearwheel pairs, and the second input shaft can be connected with the second drive machine.

11 Claims, 20 Drawing Sheets

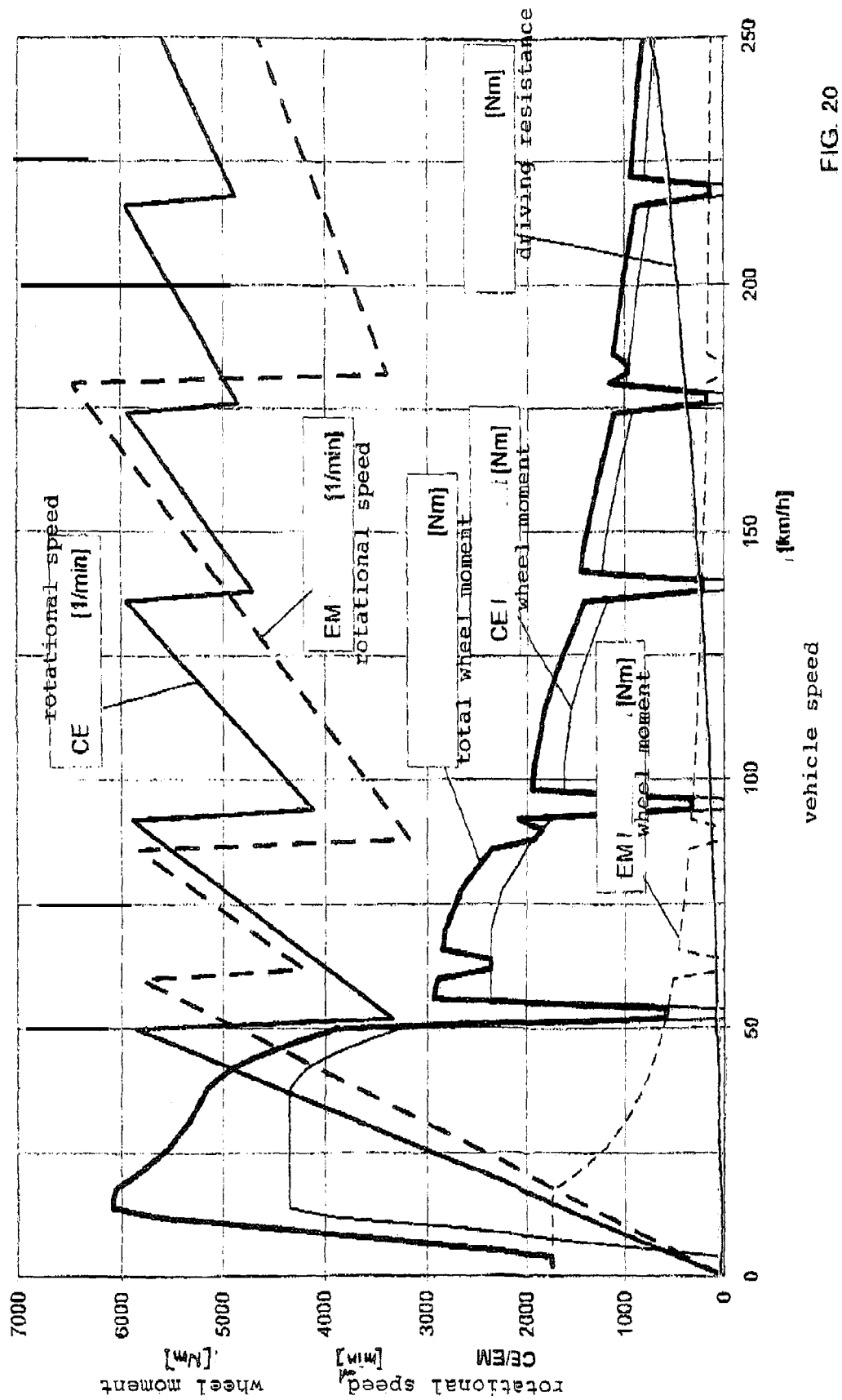

(12) United States Patent
US 8,979,693 B2

METHOD FOR THE OPERATION OF A HYBRID DRIVE SYSTEM AND HYBRID DRIVE SYSTEM COMPRISING TWO SUB-TRANSMISSIONS

CROSS-REFERENCE TO RELATED APPLICATIONS

This application is the U.S. national phase of PCT/EP2007/007471 filed Aug. 25, 2007, which claims priority of German patent application 10 2007 022 914.5 filed May 14, 2007.

FIELD OF THE INVENTION

This invention relates generally to a method for the operation of a hybrid drive system. In particular, the invention is related to a method for the operation of a hybrid drive system having two sub-transmissions.

BACKGROUND OF THE INVENTION

The invention relates to a method for the operation of a hybrid drive system as well as a hybrid drive system comprising a first drive machine, in particular an internal combustion engine, and a second drive machine, in particular an electric engine, for a motor vehicle. Other types of drive machines are not excluded. For example two electric machines can be provided as the first and second drive machines or along with an internal combustion engine as a first drive machine a hydraulic machine can be provided as the second drive machine.

Motor vehicles with hybrid drive in the most diverse embodiments have in the case of specific driving cycles a more favorable consumption behavior than motor vehicles which are driven exclusively by an internal combustion engine. Thus they are gaining increasing importance on the market.

If an electric machine is used as the second drive machine, said drive machine can be used as the engine and generator. In the engine function, which requires the supply by a battery, a starting of an internal combustion engine or a use as driving engine is possible. In the use as a generator it serves the purpose of charging the battery, wherein the energy can be obtained from the internal combustion engine or from the recuperation of the kinetic energy of the vehicle.

Hybrid drive systems are for example described in WO 2005/073005 A1, DE 100 49 514 A1 and DE 198 18 108 A1.

A hybrid drive for motor vehicles with a engaging and disengaging transmission is known from DE 199 60 621 A1, said transmission containing a first engaging and disengaging sub-transmission, which can be drive-connected optionally to a carbon fueled engine and/or an electric machine, and a second engaging and disengaging sub-transmission, which is drive-connected to the electric machine, said machine being operable as an electromotor or generator. The first sub-transmission comprises a first countershaft and an output shaft and exhibits six gear steps; the second sub-transmission comprises a second countershaft and the same output shaft and exhibits three gear steps.

SUMMARY OF THE INVENTION

Proceeding from this the present invention is based on the object of proposing a method for the operation of a hybrid drive system with which a simpler design is made possible, as well as providing a hybrid drive system which is characterized by a simpler construction in proportion to the number of gear steps that are available. In this connection in particular also a compact design for transversal installation in motor vehicles should be possible.

The solution lies in a method for the operation of a hybrid drive system with a first drive machine—in particular an internal combustion engine, and a second drive machine, in particular an electric machine, for a motor vehicle, comprising a first gearshift sub-transmission with a first input shaft that can be coupled to a output shaft by means of a first group of shifting gearwheel pairs whose input shaft can be coupled to the first drive machine, a second gearshift sub-transmission with a second input shaft that can be coupled to the output shaft by means of a second group of shifting gearwheel pairs whose input shaft is in a drive connection with the second drive machine, which is characterized in that some of the gears are represented by shifting respective individual shifting gearwheel pairs in the flow of force from one of the input shafts to the output shaft and other gears are represented by subsequent shifting of at least two shifting gearwheel pairs in the flow of force from one of the input shafts via the other input shaft to the output shaft.

The solution further lies in a method for the operation of a hybrid drive system comprising a first drive machine, in particular an internal combustion engine, and a second drive machine, in particular an electric engine, for a motor vehicle, comprising a first gearshift sub-transmission having an input shaft that can be coupled to a output shaft by means of a first group of shifting gearwheel pairs, wherein the input shaft can be coupled to the first drive machine, a second gearshift sub-transmission can be coupled to an input shaft that can be coupled to the output shaft by means of a second group of shifting gearwheel pairs, wherein the input shaft is in a drive connection with the second drive machine, characterized in that a shifting between a coupling of the first drive shaft with the output shaft and a coupling of the second drive shaft with the output shaft is brought about solely by a shifting of individual shifting gearwheel pairs.

In this connection provision is made that in operation with both drive machines shifting takes place without the interruption of the tractive force, by a shifting between the gear steps for both drive machines in the case of different driving speeds, if necessary on a rotating basis.

The solution lies finally in a hybrid drive system comprising a first drive machine, in particular an internal combustion engine, and a second drive machine, in particular an electric engine, for a motor vehicle, comprising a first gearshift sub-transmission having an input shaft and a output shaft and a first group of shifting gearwheel pairs, whose input shaft can be coupled to the first drive machine, a second gearshift sub-transmission comprising an input shaft and a output shaft and a second group of shifting gearwheel pairs, whose input shaft is coupled in a drive connection with the second drive machine, which is characterized in that at least two shifting gearwheel pairs are formed by at least two engaging and disengaging idler gears which can be coupled via switching elements to their shafts.

The essential approach to solving the problem lies in the representation of the used transmission by two sub-transmissions whose gear steps are formed in part by gear steps of conventional type, in which shifting gearwheel pairs couple an input shaft directly to the output shaft, and is formed in part by gear steps in which from an input shaft via a free-wheeling idler gear on the output shaft first torque is conducted to the second input shaft, from where then a shifting gearwheel pair couples this second input shaft directly to the output shaft.

By means of a useful sequence of the opening and closing of the friction clutch of the internal combustion engine as well as a sequence of the actuation of the shifting units of the various gears adapted to said sequence a tractive force-free shifting between the gears is possible. Critical for this type of actuation is the fact that in the case of the inventive transmission arrangement the element to be shifted (shifting clutch, shifting unit) can always be detached, while at least one drive, either the electric machine or the internal combustion engine, is in torque-transmitting connection to the output shaft. In the case of shifting the speeds of the elements to be shifted can be equalized by corresponding control of the electric machine and of the internal combustion engine. The friction clutch of the internal combustion engine allows a grinding engagement of the internal combustion engine, as is customary.

On the basis of the selected arrangement of the electrical machine and of the internal combustion engine in the case of the operation of both drive machines a torque addition takes place. As described in the following, a starting is possible with the electric machine as well as a generator operation of the electric machine in recuperation mode.

Further favorable embodiments are in the dependent claims, to whose contents reference is made here.

Subsequent features and advantages of the subject matter of the invention will be designated in the following once more in tabular form:

Shifting without interruption of the tractive force, i.e. at least one of the drive machines can in the case of the actuation of one or more switching elements continue transferring torque to the drive shaft, however this function is, depending on the selection of the transmission ratio not given in the case of all possible selection sequences;

purely electric driving is possible;

Starting of the internal combustion engine by the electric machine is possible;

Starting of the internal combustion engine during the purely electric driving with the electric machine is possible, also via different gears;

Active synchronization of the shifting of gears is possible;

Boost operation, i.e. intermittent engagement of the electric machine is possible;

Recuperation, i.e. recovery of energy by means of the electric machine in the case of the braking of the motor vehicle is possible;

Air conditioner compressor operation in the case of the immobilization of the motor vehicle is possible;

Retaining of the AMT functionality (automated manual transmission) in the case of the failure of the electric machine (fail safe);

Good efficiency through consumption-optimized shifting strategies using the good efficiency of a conventional manual transmission (gear transmission) and with this fuel economy is possible;

Depending on the selection of the switching elements and the friction clutch no transmission hydraulics are required.

For the representation of a non-hybrid transmission variant the electric machine can be quite drastically reduced in its size. It can then continue to be used as a starter, even for start stop operation, as a light machine and for the active synchronization of the transmission. In the process to a limited extent possibly also a boost operation, i.e. an electric accessory drive and a recuperation operation, i.e. electric energy recovery is conceivable.

In comparison to known transmissions of the initially named type additional gears are generated by the subsequent shifting of several shifting gearwheel pairs in some of the shift states. In the process in the case of equal number of gear steps a lower mechanical complexity (number of shafts, number of switching elements, number of gears) can be ensured, in particular in the case of a transmission for a front wheel drive with transversal engine installation.

A separate clutch unit for the interconnection of the input shafts is completely omitted. The shifting gearwheel pairs are used for the interconnection of the input shafts.

BRIEF DESCRIPTION OF THE DRAWINGS

The different operating states, which in the foregoing are only implied, arise in detail from the following description of the drawings.

Two preferred exemplary embodiments of the invention are shown in the drawings and will be described below. The figures show the following:

FIG. 20 shows the speeds of the drive machines as well as the drive axle torque at the motor vehicle speed.

DETAILED DESCRIPTION OF THE INVENTION

Figure 1:
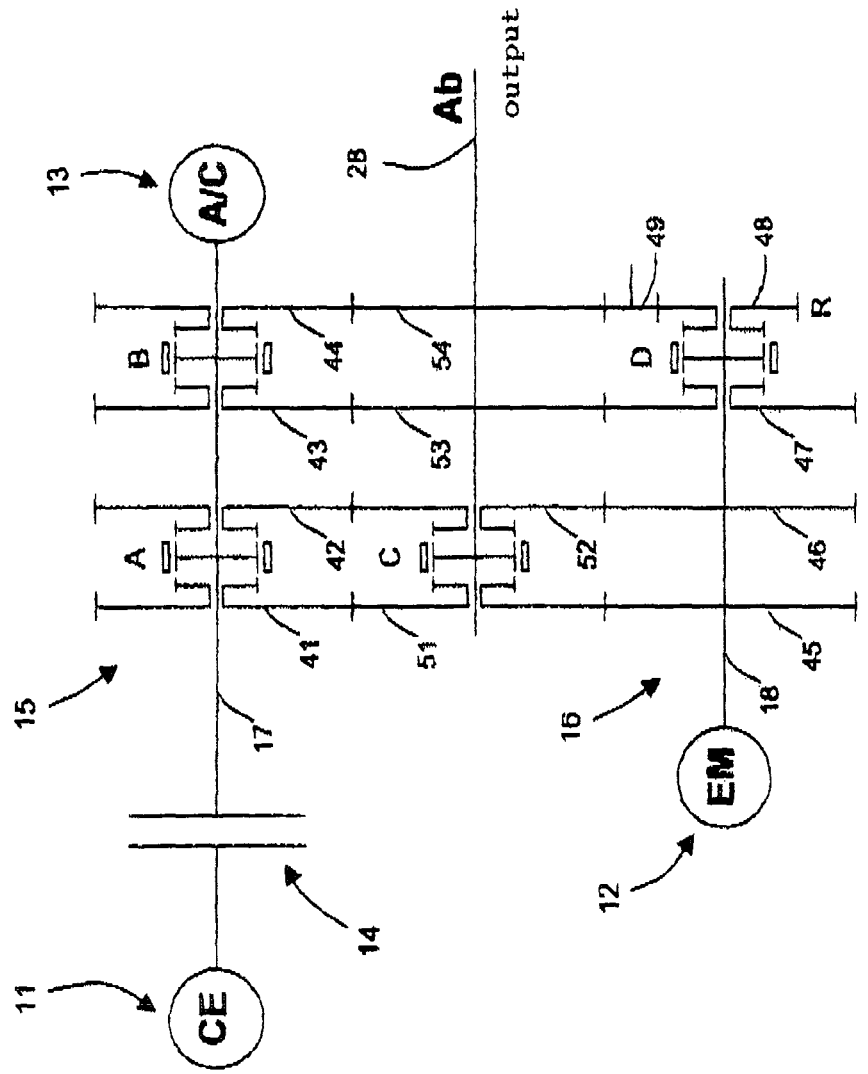
FIG. 1 shows the kinematic diagram of an inventive hybrid drive system in a first embodiment in neutral position.

FIG. 1 shows an inventive hybrid drive system in a first embodiment. The subsequent description of FIG. 1 holds true in principle also for FIGS. 2 through 14, which represent the different shift states of the kinematic diagram according to FIG. 1 and in the further sense also for FIGS. 15 and 16, which represent the inventive hybrid drive system in a second and third modified embodiment.

A hybrid system is represented which comprises a main drive machine 11, here in the form of an internal combustion engine 11 (CE), an accessory drive machine 12, here in the form of an electric machine (EM), and an auxiliary drive machine 13, here in the form of a compressor for an air conditioner (air conditioning A/C). The internal combustion engine 11 can be coupled with the transmission by a friction clutch 14 as starting element, which can be constructed as a wet clutch or a dry clutch. The transmission comprises two gearshift sub-transmissions 15, 16 (multiple step variable speed transmission) which are characterized in that they each exhibit an input shaft 17, 18. The input shaft 17 of the first gearshift sub-transmission 15 can be coupled to the internal combustion engine 11 via the friction clutch 14 while the input shaft 18 of the second gearshift sub-transmission 18 is firmly coupled to the electric machine 12. The auxiliary drive machine 13 is likewise firmly coupled to the input shaft 17 of the first gearshift sub-transmission 15. The input shaft 17 is coupled via four gearwheel pairs 41/51, 42/52, 43/53, 44/54 to an output shaft 28. The input shaft 18 is likewise coupled via four gearwheel pairs 45/51, 46/52, 47/53, 48/54 to the output shaft 28. The output shaft 28 can be connected to the differential gear of a vehicle axle via a gear step not shown here. In the gearshift sub-transmission 15 the gearwheels 41, 42, 43, 44 on the first input shaft 17, which cooperation with the gearwheels 51, 52, 53, 54 on the output shaft 28, are all shift gears, wherein the gearwheels 41, 42 share a first shifting unit A and the gearwheels 43, 44 share a second shifting unit B. In addition the gearwheels 51, 52 on the output shaft 28 are also in accordance with the invention shift gears, which are actuated by a third shifting unit C.

In the second gearshift sub-transmission 16 the gearwheels 45, 46 are fixed gears which with the gearwheels 51, 52 on the output shaft 28 form gearwheel pairs, wherein the latter are shift gears, which are interconnected by the shifting unit C. On the other hand the gearwheels 47, 48 on the second input shaft 18, which with the gearwheels constructed as fixed gears form gearwheel pairs on the output shaft 28, are shift gears, which are connected by means of a fourth shifting unit D. The gearwheel 48 acts via an intermediate gear 49 on the gearwheel 54, so that this group of gears is suitable for the representation of a reverse gear R.

Through the embodiment of the gearwheel pairs, in which case both wheels are shift gears, for one thing a normal shifting including the gearshift sub-transmission 15 and the gearshift sub-transmission 16 is possible for automotive propulsion, on the other hand with this the possibility of the subsequent shifting of transmission stages from both gearshift sub-transmissions 15, 16 is given, so that the effective number of the gears of the transmission increases.

Figure 2:
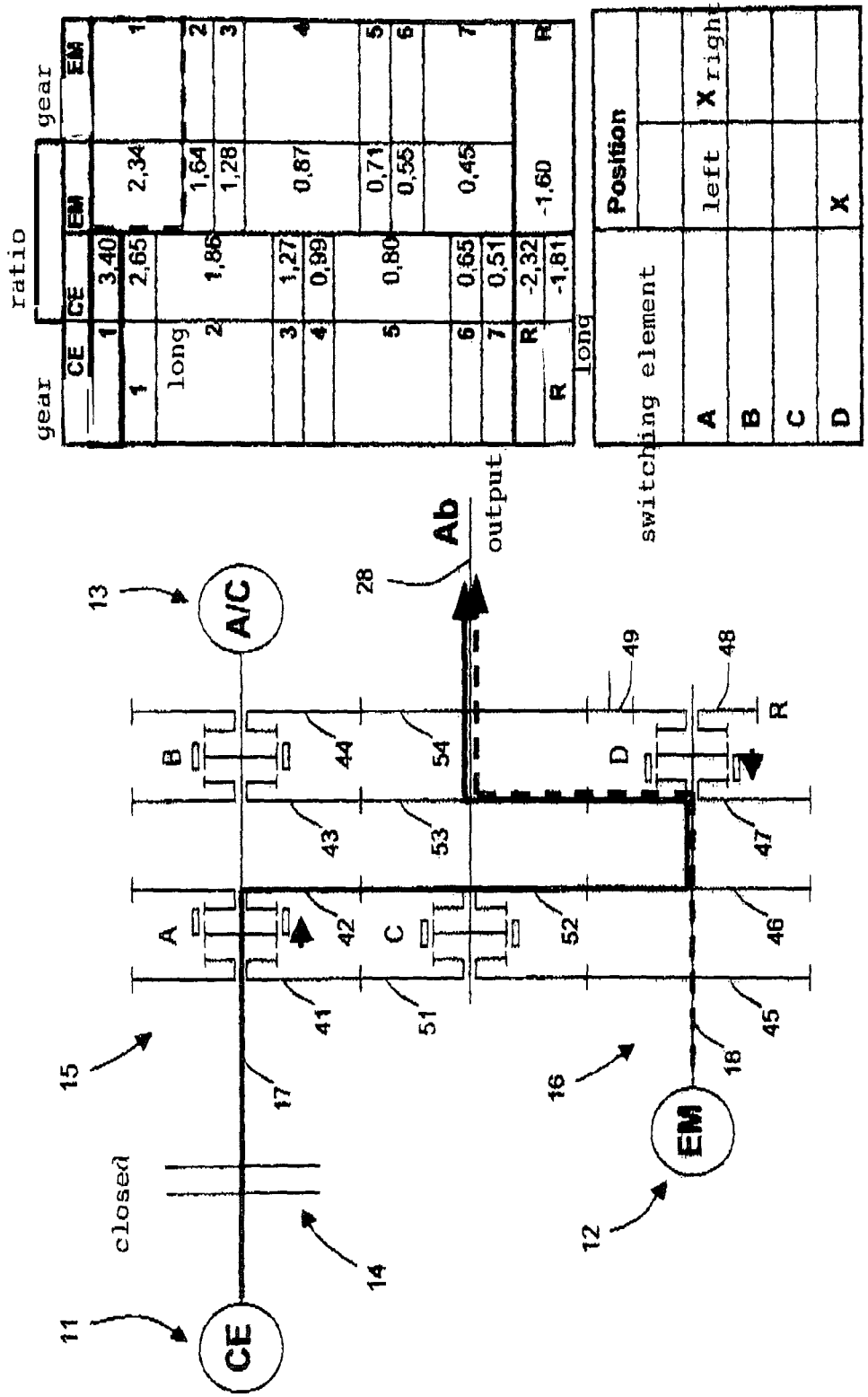
FIG. 2 shows the kinematic diagram according to FIG. 1 in the case of starting up and driving in first gear.

In FIG. 2 the shift state for the forward travel in first gear is shown using both drive machines (CE, EM). The friction clutch 14 is closed. The switching element A is shifted to the right. With this for the internal combustion engine 11 the first gear is represented by use of the gearwheels 42, 52 and 46 with the introduction of torque from the first to the second input shaft 18, while the first gear for the electronic machine is engaged by the shifting of the switching element D to the left. Both drive machines drive the output shaft 28 through the cooperation of the gearwheels 47 and 53. The gearwheel 52 acting as intermediate gear freewheels on the output shaft 28. In the case of a shifting of the switching element A to the left a longer first gear 1L would arise for the internal combustion engine 11, which however would be too close of a ratio.

Figure 3:
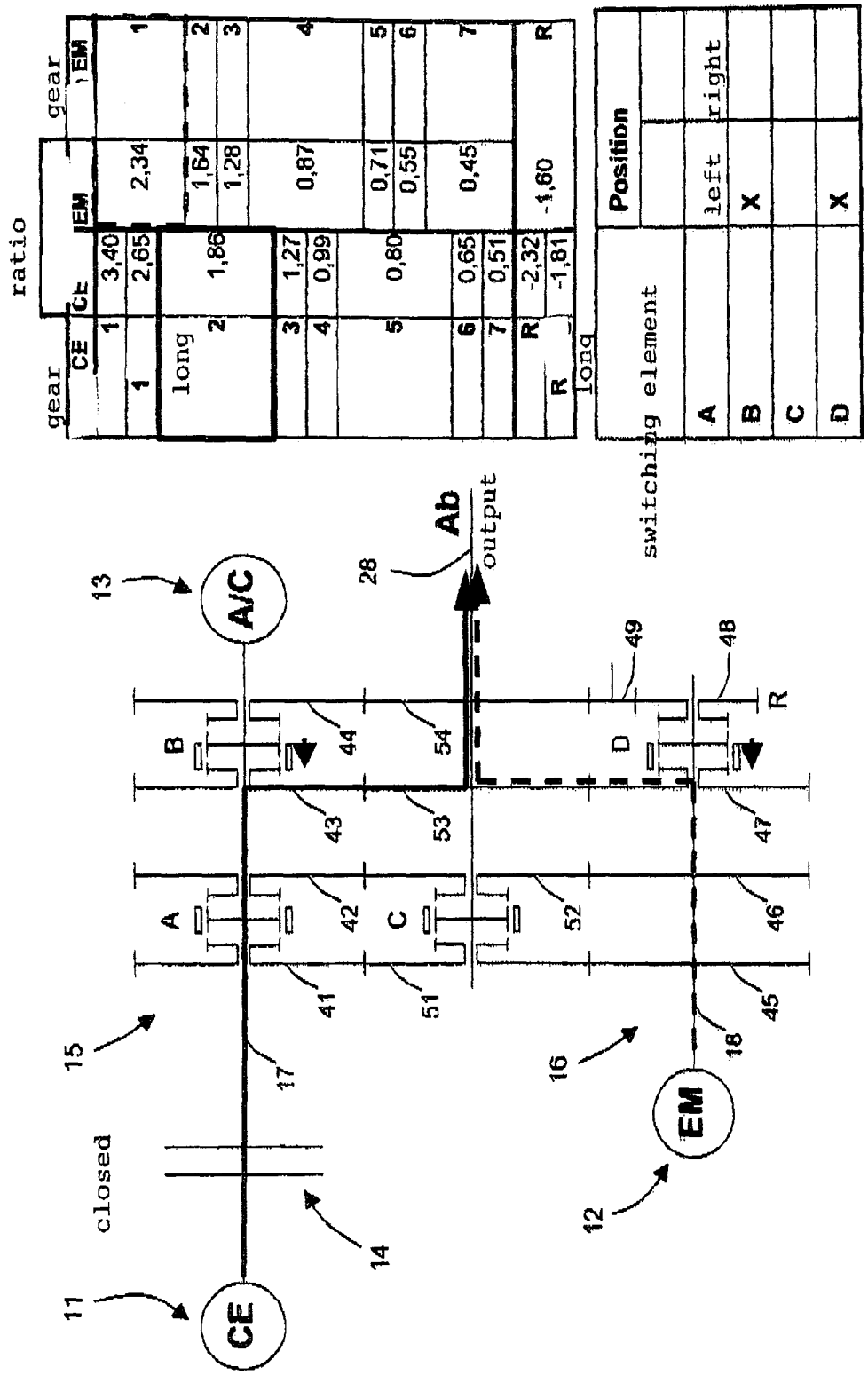
FIG. 3 shows the kinematic diagram according to FIG. 1 in the case of shifting to second gear.

In FIG. 3 the changeover from the aforementioned first gear for the internal combustion engine 11 to the second gear is shown on the other hand using both drive machines CE, EM. The friction clutch 14 is closed. In the second sub-transmission 16 by leaving the switching element D in the left position the first gear for the electric machine 12 is retained by the pairing of the gearwheels 47, 53, so that the first sub-transmission 15 can be shifted without interruption of the tractive force. After the opening of the friction clutch 14 the switching element A is brought into the neutral position, while the switching element B is shifted to the left so that now the gearwheels 43, 45 are active. After a closing of the friction clutch 14 the internal combustion engine 11 is in the second gear for the internal combustion engine.

Figure 4:
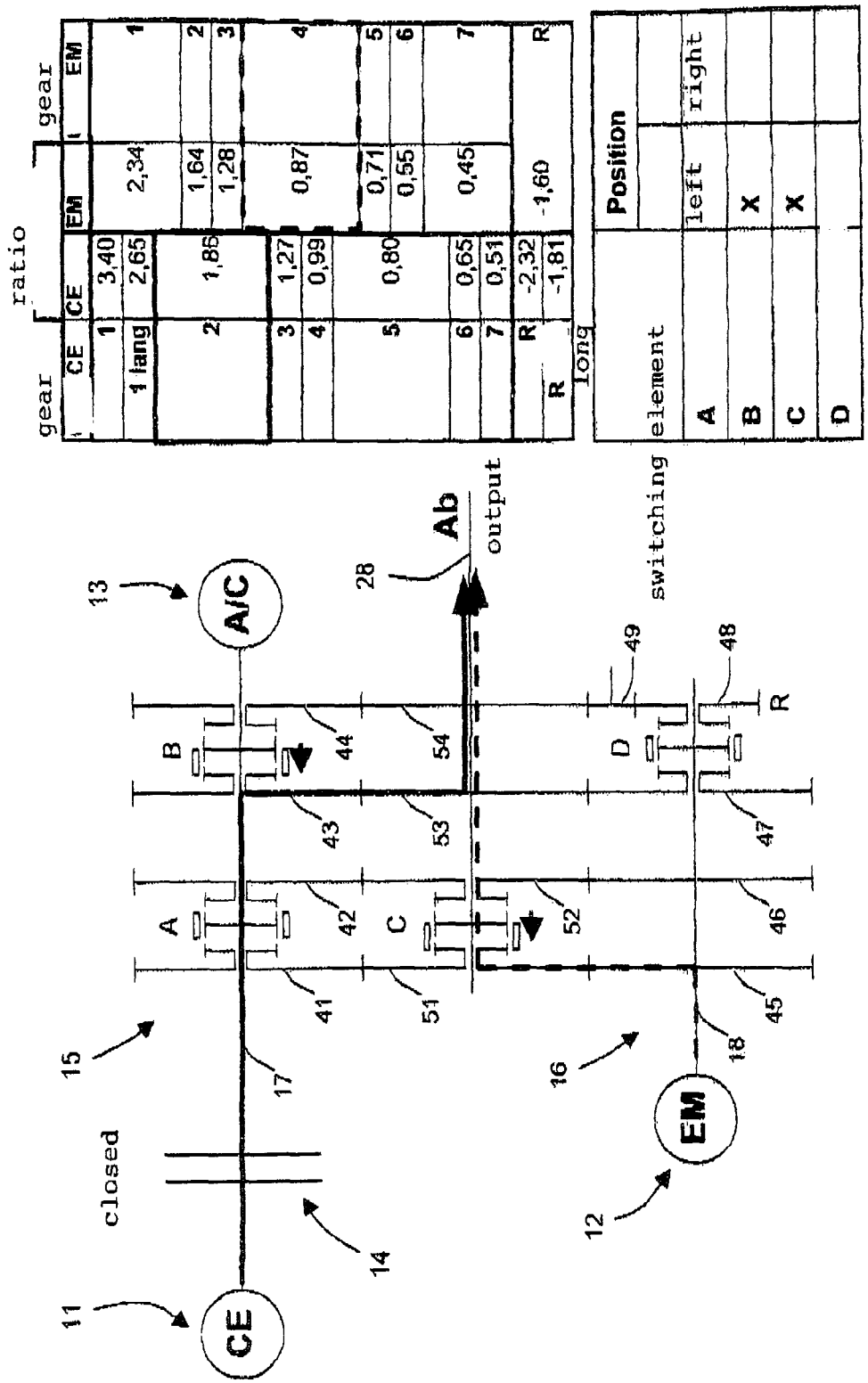
FIG. 4 shows the kinematic diagram according to FIG. 1 in the case of shifting the electric machine to a higher gear.

In FIG. 4 the shift state is for preparation of the next gear change, wherein the switching element B furthermore is shifted to the left, so that in the case of closed friction clutch 14 the second gear for the internal combustion engine 11 continues to be formed by the active gearwheel pairing 43, 53. On the other hand the switching element D is shifted to the neutral position, so that the first gear of the second sub-transmission 16 is removed. The electric machine 12 can now pre-synchronize the next gear, subsequently the switching element C is shifted to the left so that the electric machine 121 drives the output shaft 28 via the active gearwheel pairing 45, 51, which forms the fourth gear for the electric machine. The gears EM 2 and EM 3 are skipped in this example.

Figure 5:
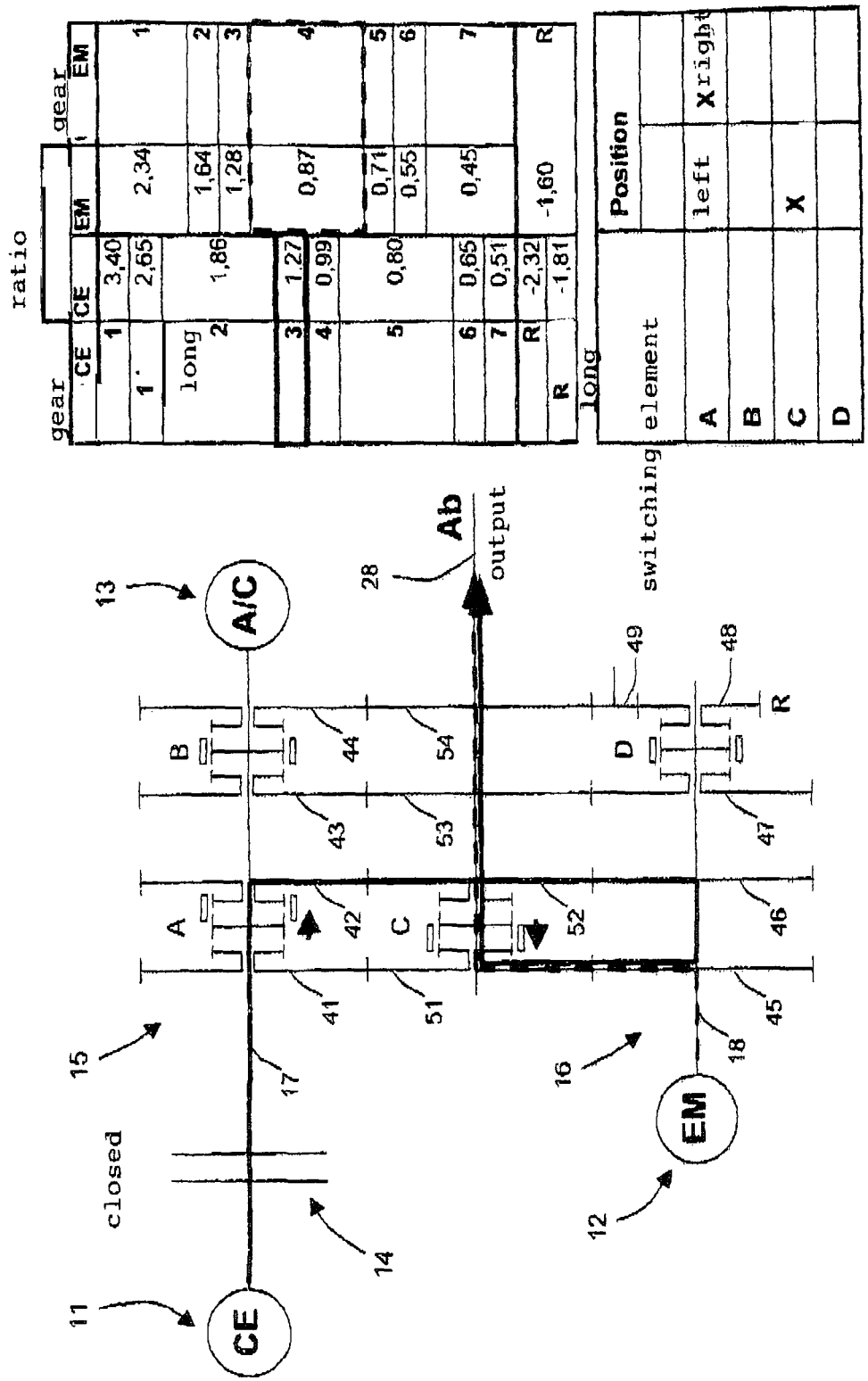
FIG. 5 shows the kinematic diagram according to FIG. 1 in the case of upshifting from second gear to third gear.

FIG. 5 shows the transition from the second to the third gear of the internal combustion engine 11 in the case of the use of both drive machines. The friction clutch 14 is closed. In the second sub-transmission 16 furthermore the fourth gear of the electric machine 12 is engaged in the form of the gear pairings 45, 51, so that in the first sub-transmission 15 a shifting of gears can take place without interruption of the tractive force at the output shaft 28. After the opening of the friction clutch 14 for this purpose the switching element B is transferred to the neutral position, while the switching element A is shifted to the right. After that the friction clutch 14 is closed again. With this the third gear of the internal combustion engine 11 is represented, which brings about the cooperation of the gearwheels 42, 52 and 46 in order to conduct torque from the first input shaft 17 to the second input shaft 18. The intermediate gear 52 is in this connection activated by the output shaft 28.

Figure 6:
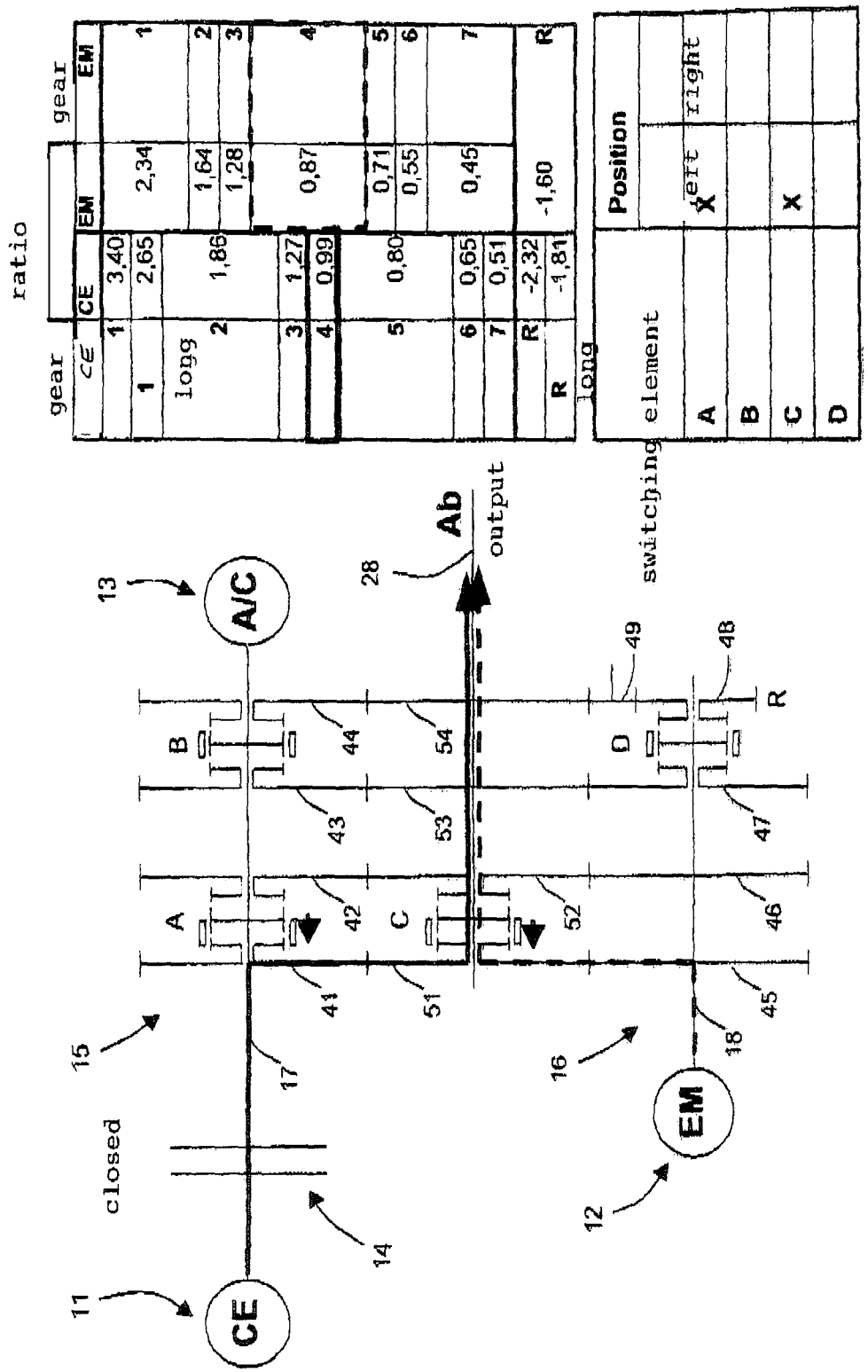
FIG. 6 shows the kinematic diagram according to FIG. 1 in the case of upshifting from third gear to fourth gear.

FIG. 6 shows the transition form the third to the fourth gear in the drive of the internal combustion engine 11. The friction clutch 14 is closed. The second sub-transmission 16 remains in the previously achieved position in its fourth gear, wherein the switching element C is shifted to the left and the gearwheel pairing 45, 51 remains active between the second input shaft 18 and the output shaft 28. Proceeding from the previously shown position, the switching element A is shifted after the opening of the friction clutch 14 from the right to the left, so that immediately the gearwheels 41, 51 are coupled, said gearwheels forming the fourth gear of the internal combustion engine 11. Then the friction clutch 14 is closed again.

Figure 7:
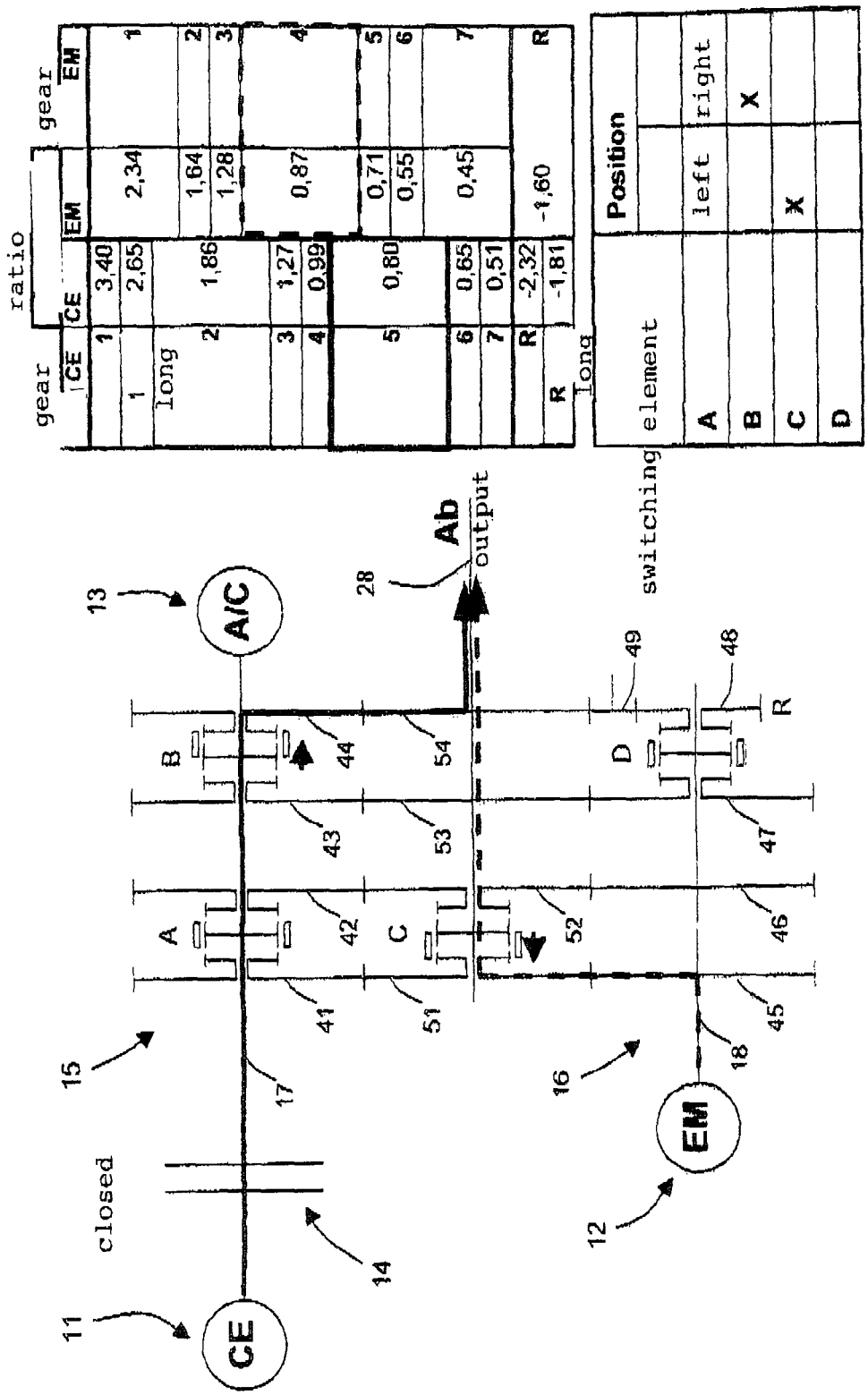
FIG. 7 shows the kinematic diagram according to FIG. 1 in the case of upshifting from fourth gear to fifth gear.

In FIG. 7 the transition from the fourth to the fifth gear is shown in the drive train of the internal combustion engine 11, wherein the drive of the electric machine 12 continues to remain in the fourth gear of the second sub-transmission in order to make possible a shifting without interruption of the tractive force, i.e. the switching element C is furthermore shifted to the left in order to transmit torque from the second input shaft 18 to the output shaft 28 in the fourth gear of the electric machine. After an opening of the friction clutch 14 the switching element A, previously shifted to the left, is transferred to the neutral position in order to decouple the gearwheel 41 from the input shaft 17. At the same time the switching element B is shifted to the right in order to firmly connect the gearwheel 44 to the input shaft 17. As a result of this the gearwheel paring 44, 54 becomes active, said gearwheel pairing forming the fifth gear for the drive of the internal combustion engine. Then the friction clutch 14 is closed again.

Figure 8:
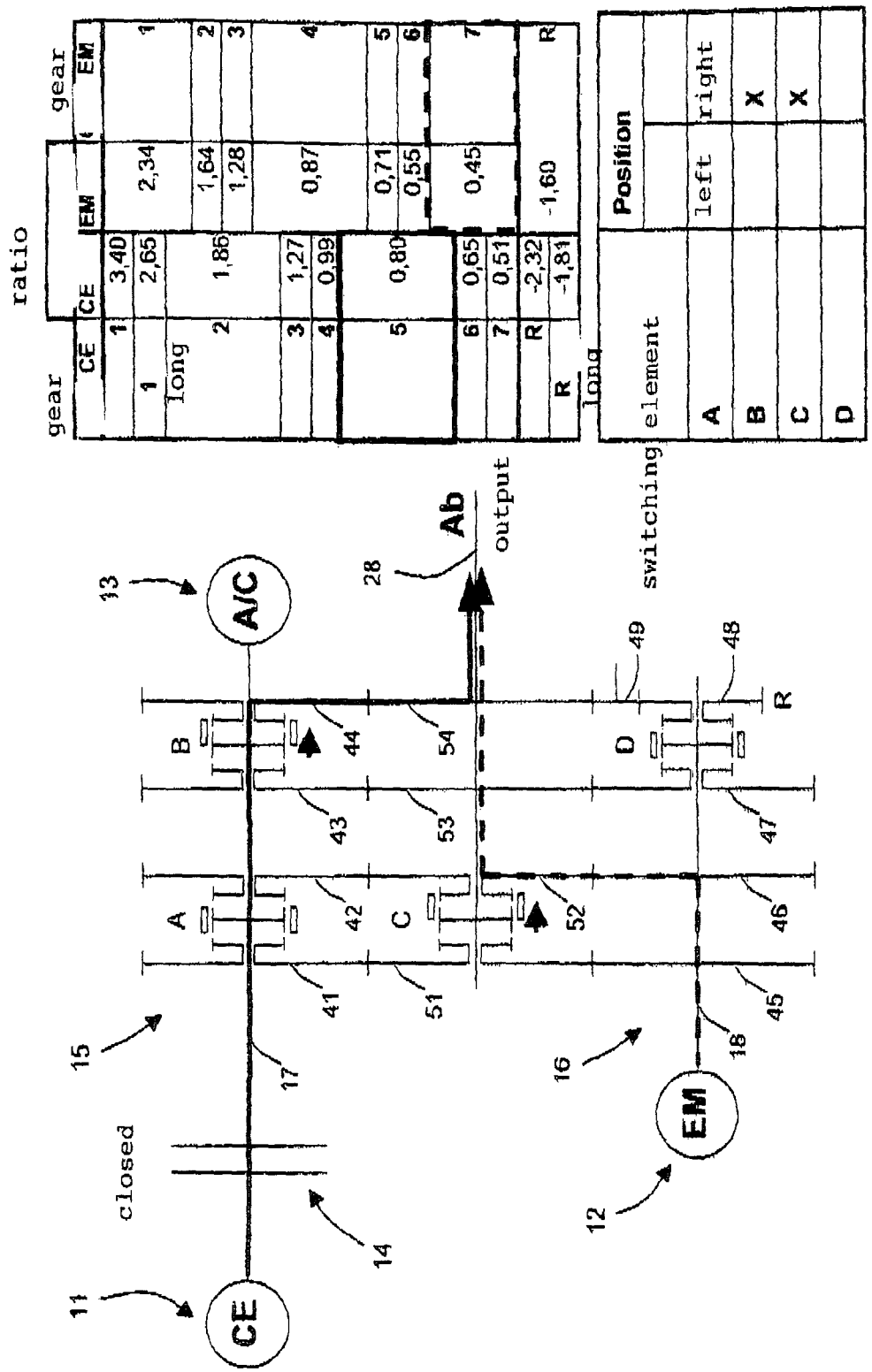
FIG. 8 shows the kinematic diagram according to FIG. 1 in the case of shifting the electric machine to a higher gear.

FIG. 8 shows how for preparation of the next shifting of gears in the drive of the internal combustion engine 11 the drive of the electromotor 12 is changed by shifting the switching element C from the left first to the neutral position in order to remove the fourth gear of the second sub-transmission 16. The electric machine can now pre-synchronize to the next gear. Then the switching element C is shifted to the right. With this in the drive of the electric machine 12 the gearwheel pairing 46, 52 becomes active, which represents the seventh gear in the second sub-transmission, i.e. of the electric machine, while the drive of the internal combustion engine 11 remains in the previously described transmission of the gearwheel pairing 44, 54. The gears EM 5 and EM 6 are skipped in this example.

Figure 9:
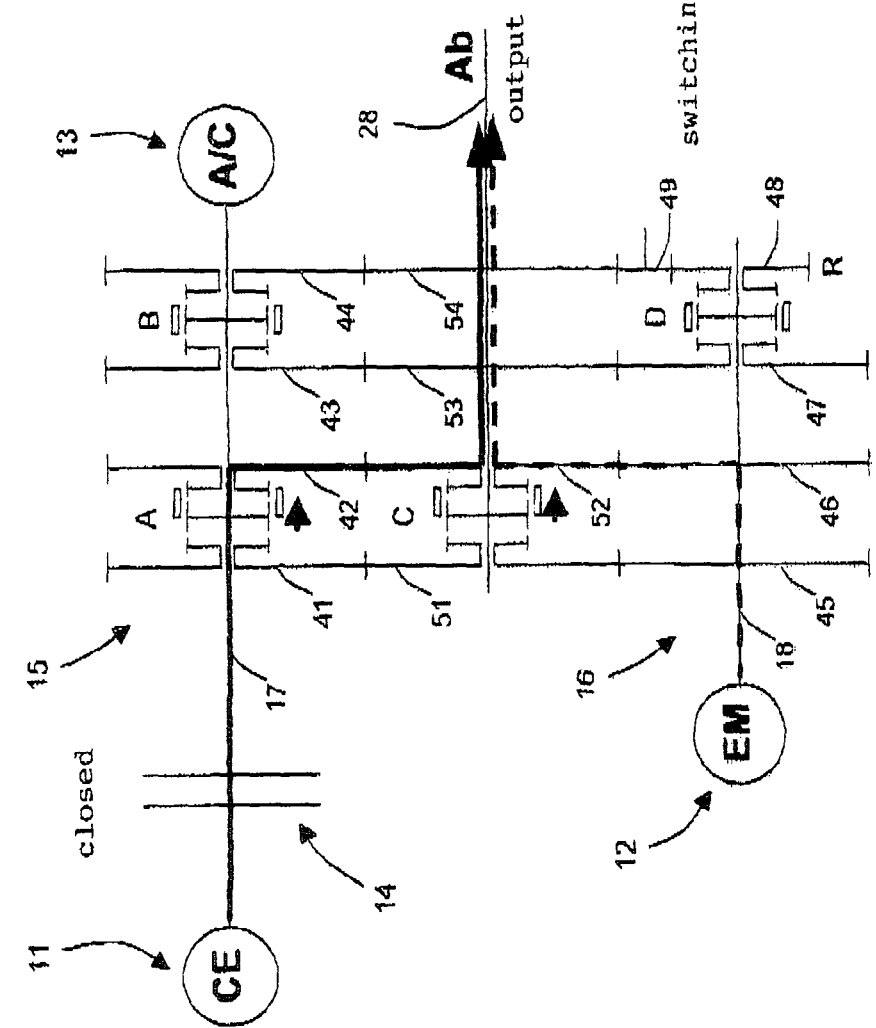
FIG. 9 shows the kinematic diagram according to FIG. 1 in the case of upshifting from fifth gear to sixth gear.

FIG. 9 shows how now in the case of the retention of the seventh gear of the electric machine 12 formed by the gearwheel pairing 46, 52, i.e. in the case of the switching element C shifted to the right the shifting takes place in the drive of the internal combustion engine 11. Here the friction clutch 14 is first opened. The switching element B, first shifted to the right, is transferred to the neutral position, while the switching element A is shifted to the right. With this the gearwheel 42 is coupled to its input shaft 17, so that the drive from the input shaft 17 to the output shaft 28 takes place via the gearwheel pairing 42, 52, which forms the sixth gear for the internal combustion engine 11. Then the friction clutch 14 is closed again.

Figure 10:
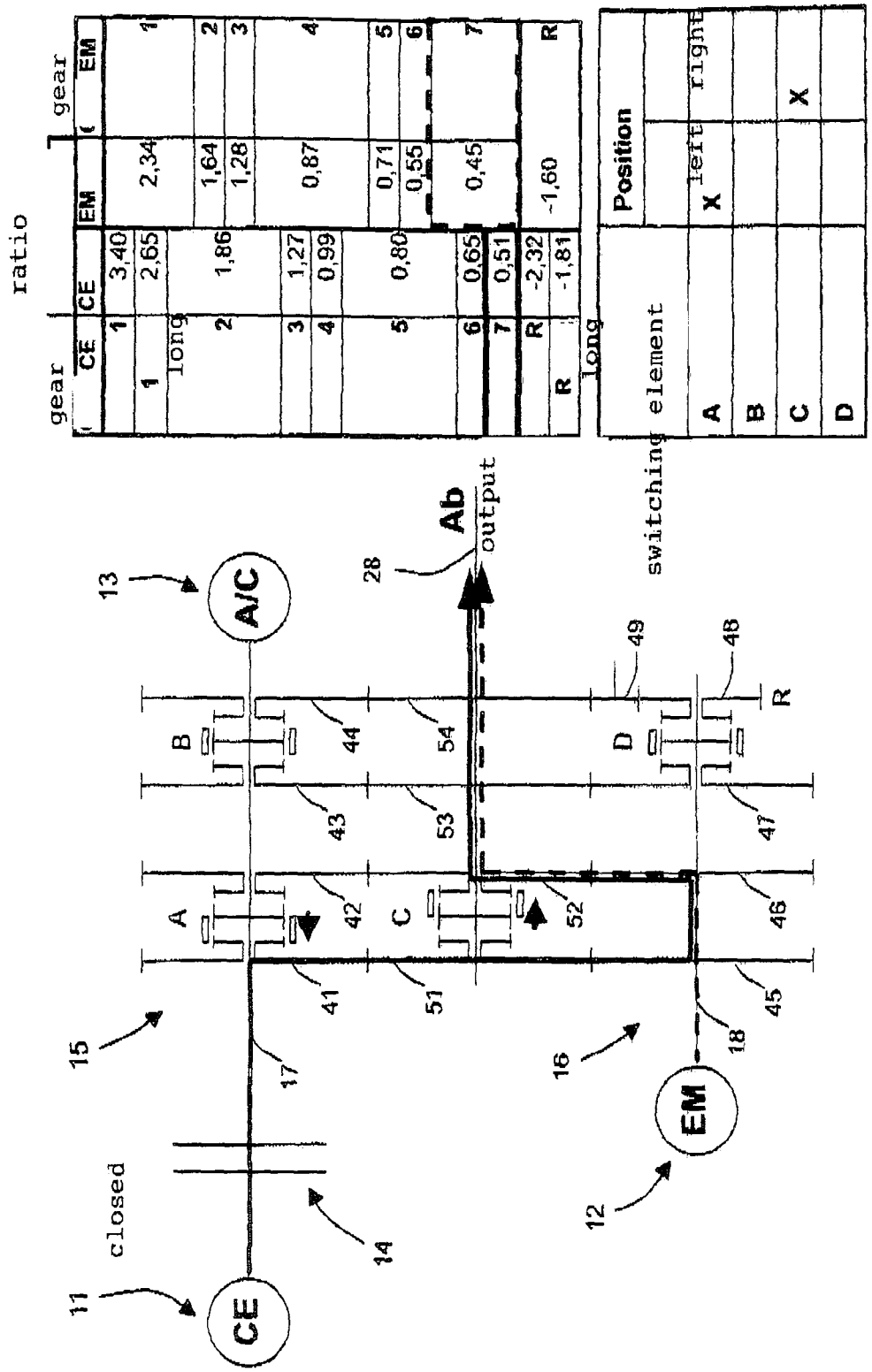
FIG. 10 shows the kinematic diagram according to FIG. 1 in the case of upshifting from sixth gear to seventh gear.

FIG. 10 shows how in retaining the shift position in the second sub-transmission 16 for the drive of the electric machine 12, namely retaining the seventh gear, which is formed by the gearwheel pairing 46, 52 now also the drive of the internal combustion engine 11 the shifting to the seventh gear takes place. For this purpose the switching element A, previously shifted to the right, is transferred to the left after the opening of the friction clutch. The gearwheel 42 is decoupled from the input shaft while the gearwheel 41 is coupled to the input shaft 17. With this the gearwheel pairing 41, 51 is engaged. Since however the gearwheel 51 is decoupled from the output shaft 28, after a closing of the friction clutch 14 via the gearwheel group 41, 51, 45 torque is transferred from the first input shaft 17 to the second input shaft 18, said second input shaft via the coupled gearwheel pairing 46, 52 driving the output shaft 28 now in seventh gear for the internal combustion engine.

Figure 11:
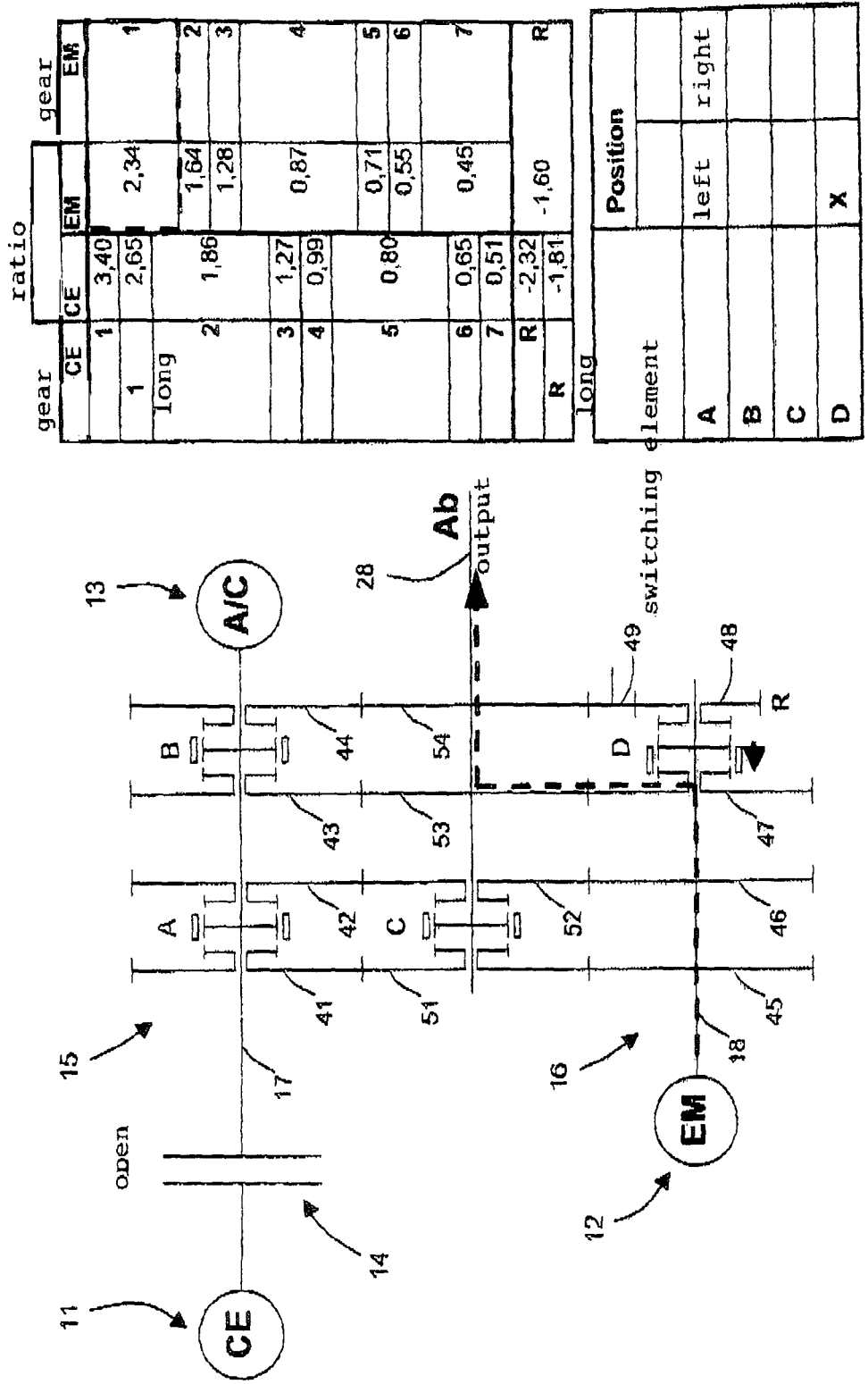
FIG. 11 shows the kinematic diagram according to FIG. 1 in the case of starting up and driving with the electric machine EM.

FIG. 11 shows a shift state which represents an electric travel drive or an energy recovery in the electric machine 12, wherein the internal combustion engine 11 is decoupled by opening of the friction clutch 14 and in other respects by setting of the switching elements A, B C to the neutral position also no transmission of torque can take place from the first input shaft 17 to the second input shaft 18. Exclusively switching element D is shifted to the left, as a result of which the gearwheel 47 is coupled to the input shaft 18 and the gearwheel pairing 47, 53 forms the first gear in the second sub-transmission 16. The transmission ratio is one 1:2.34.

Figure 12:
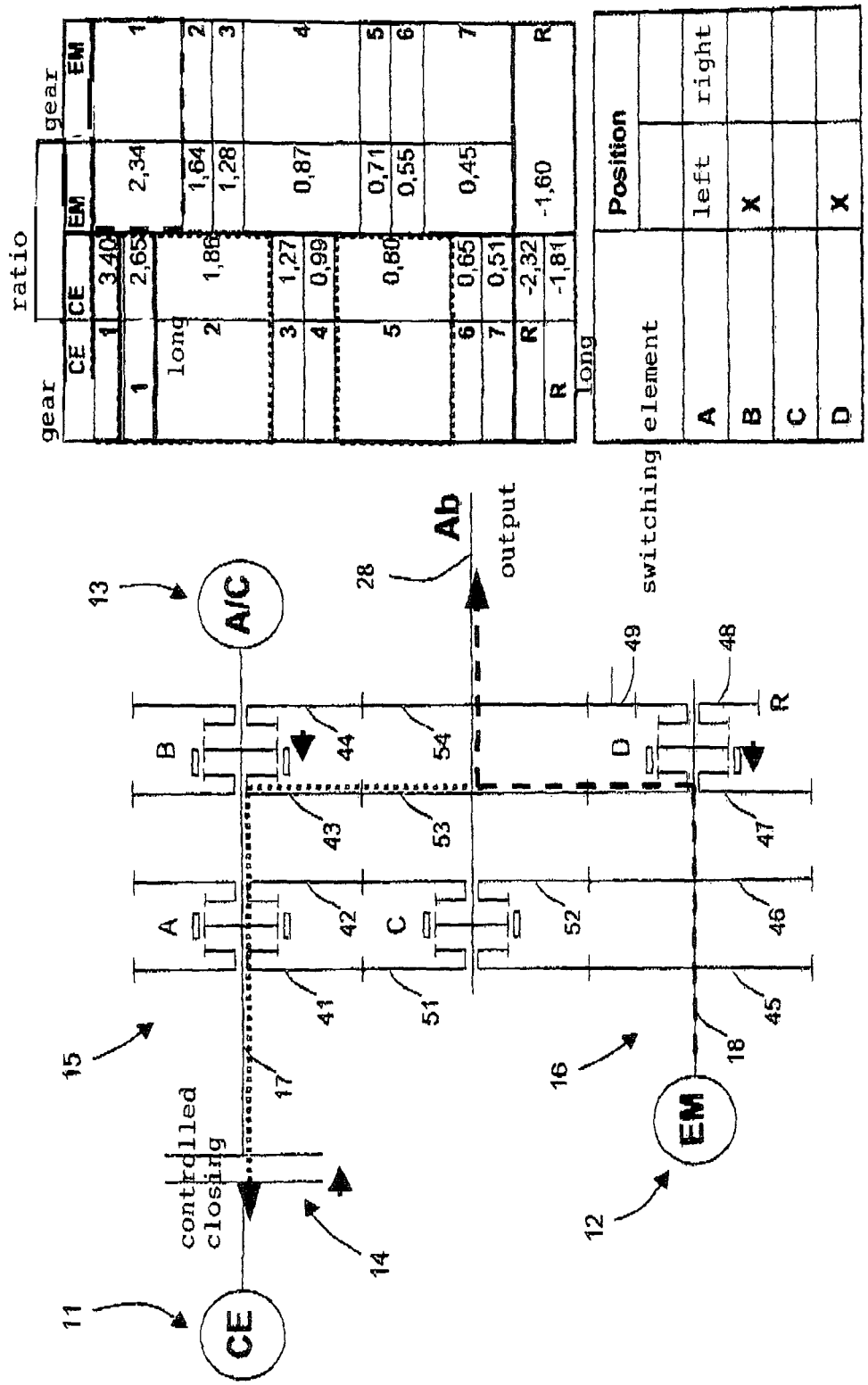
FIG. 12 shows the kinematic diagram according to FIG. 1 in the case of the starting of the internal combustion engine CE by the electric machine EM in the case of electric travel drive.

FIG. 12 shows how proceeding from the previously described situation in the second sub-transmission 16 namely in the case of engaged first gear in the case of propulsion of the electric machine 12 by closing of the friction clutch 14 and through shifting of the switching element B to the left the internal combustion engine can be started using the second gear. The starting of the internal combustion engine 11 can however also take place using the first or fifth gear of the first sub-transmission 15. For this purpose the switching elements A, B, C are brought into the positions shown in the preceding figures in conjunction with the forward travel for the corresponding gears.

Figure 13:
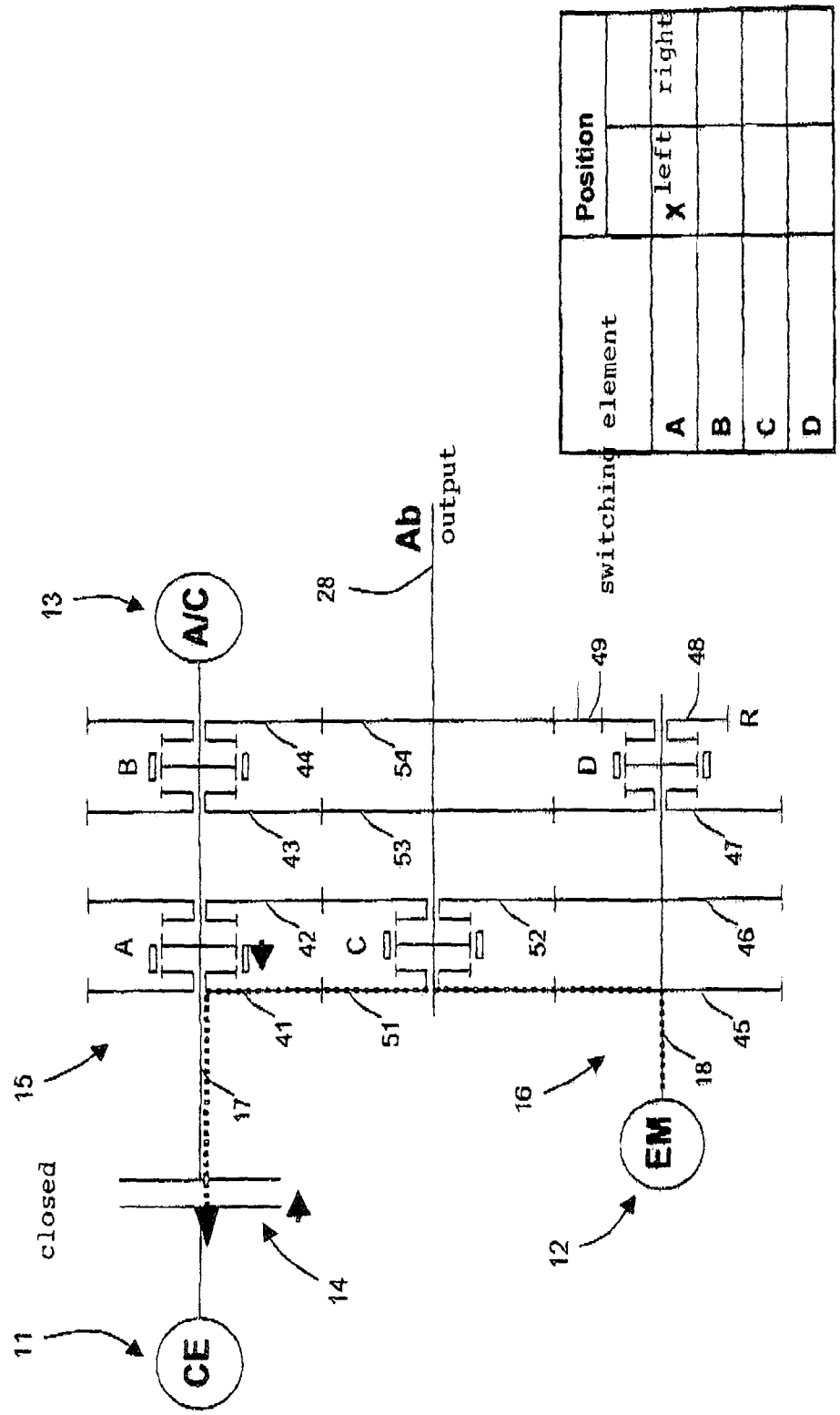
FIG. 13 shows the kinematic diagram according to FIG. 1 when the vehicle is stationary in the case of starting of the internal combustion engine CE by the electric machine EM when the vehicle is stationary.

FIG. 13 shows the starting of the internal combustion engine by means of the electric machine 12. The switching element C is in the neutral position, so that the output shaft 28 is released and the gearwheel 51 serves only as intermediate gear between the gearwheel 45 and gearwheel 41. The gearwheel 41 is coupled to the first input shaft 17 by shifting of the switching element A to the left, so that by closing of the friction clutch 14 the internal combustion engine 11 can be started.

Figure 14:
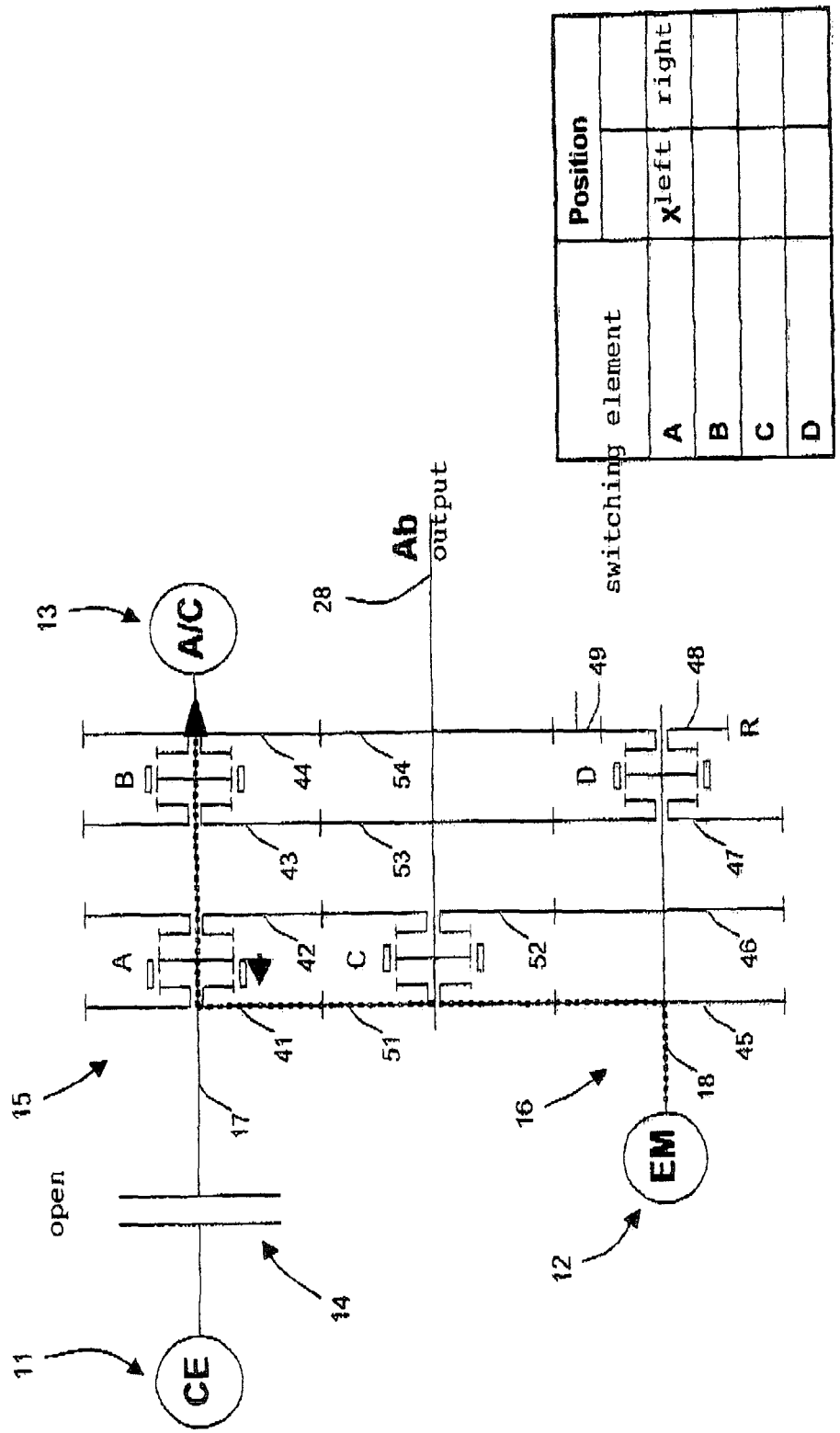
FIG. 14 shows the kinematic diagram according to FIG. 1 when the vehicle is stationary in the case of compressor drive.

FIG. 14 shows a shift state in which case the air conditioner compressor 13 can be electrically driven by the electromotor 12 in the case of motor vehicle immobilization. The internal combustion engine 11 is decoupled from the first input shaft 17 by opening the friction clutch 14. By shifting the switching element C to the neutral position the output shaft 28 is likewise decoupled, so that the gearwheel 51 forms only an intermediate gear between the gearwheel 45 on the second input shaft 18 and the gearwheel 41 on the first input shaft 17. This latter gearwheel 41 is coupled to the first input shaft 17 by shifting the switching element A to the left, upon said first input shaft the air conditioner compressor 13 is in fixed arrangement. In the case of a conceivable shifting of the switching element A to the right similarly the drive could in the case of additionally decoupled output shaft 28 take place via the gearwheels 46, 52 and 42 from the second input shaft 18 to the first input shaft 17 for the driving of the air conditioner compressor 13.

Figure 15:
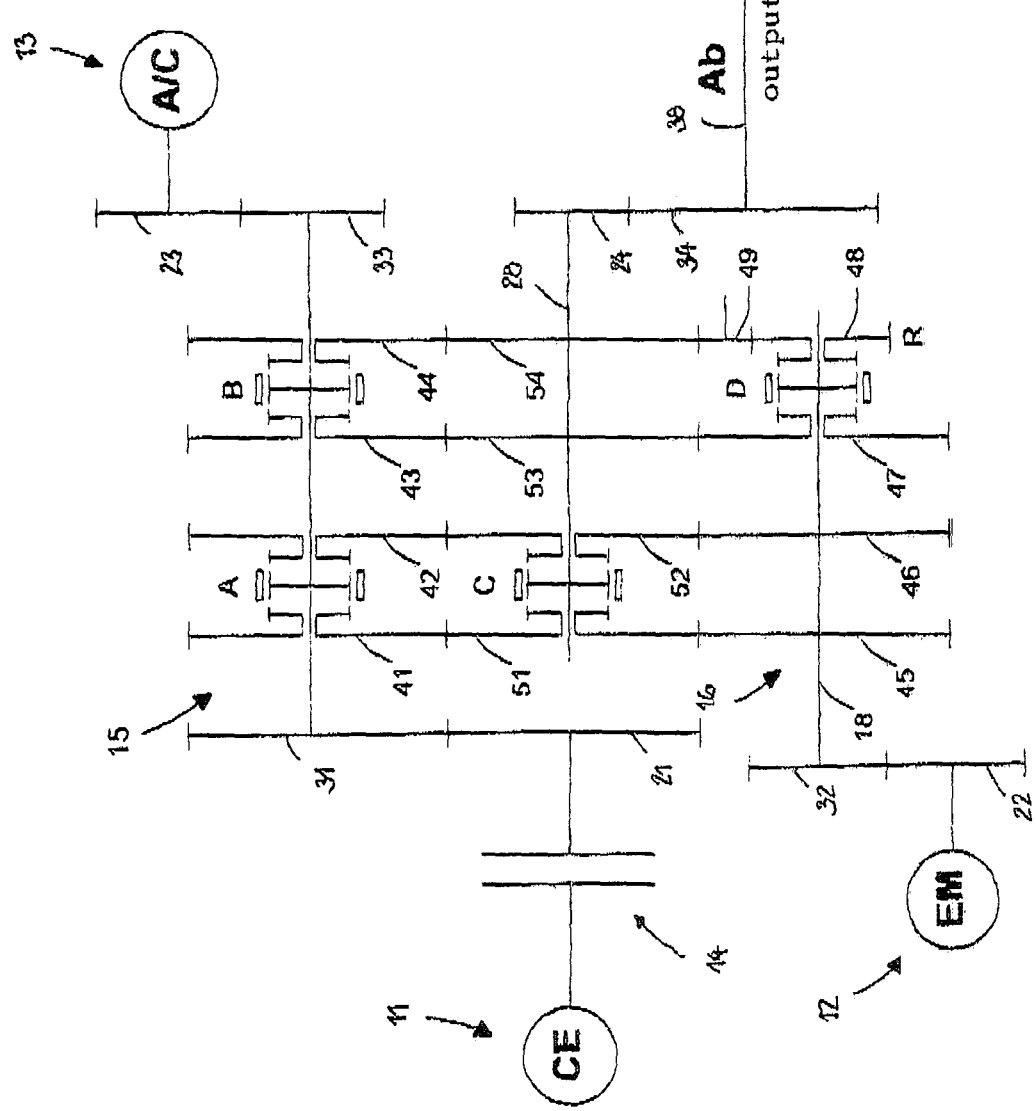
FIG. 15 shows the kinematic diagram of an inventive hybrid drive system in a second modified embodiment in neutral position.

FIG. 15 shows a modified embodiment of the transmission according to FIG. 1, wherein here too all switching elements A, B, C, D are represented in the neutral position. In FIG. 15, in derogation from FIG. 1 the outlet side of the friction clutch 14 of the first drive machine 11 is drive-connected to the first input shaft 17 via a gearwheel pairing 21/31, the second drive machine 12 is drive-connected to the second input shaft 18 via a gearwheel pairing 22/32 and the auxiliary drive machine 13 is drive-connected to the first drive shaft 17 via a gearwheel pairing 23/33. Finally the output shaft 28 is coupled to an output shaft 38 via a gearwheel pairing 24/34. All other details are identical to those in FIG. 1.

Figure 16:
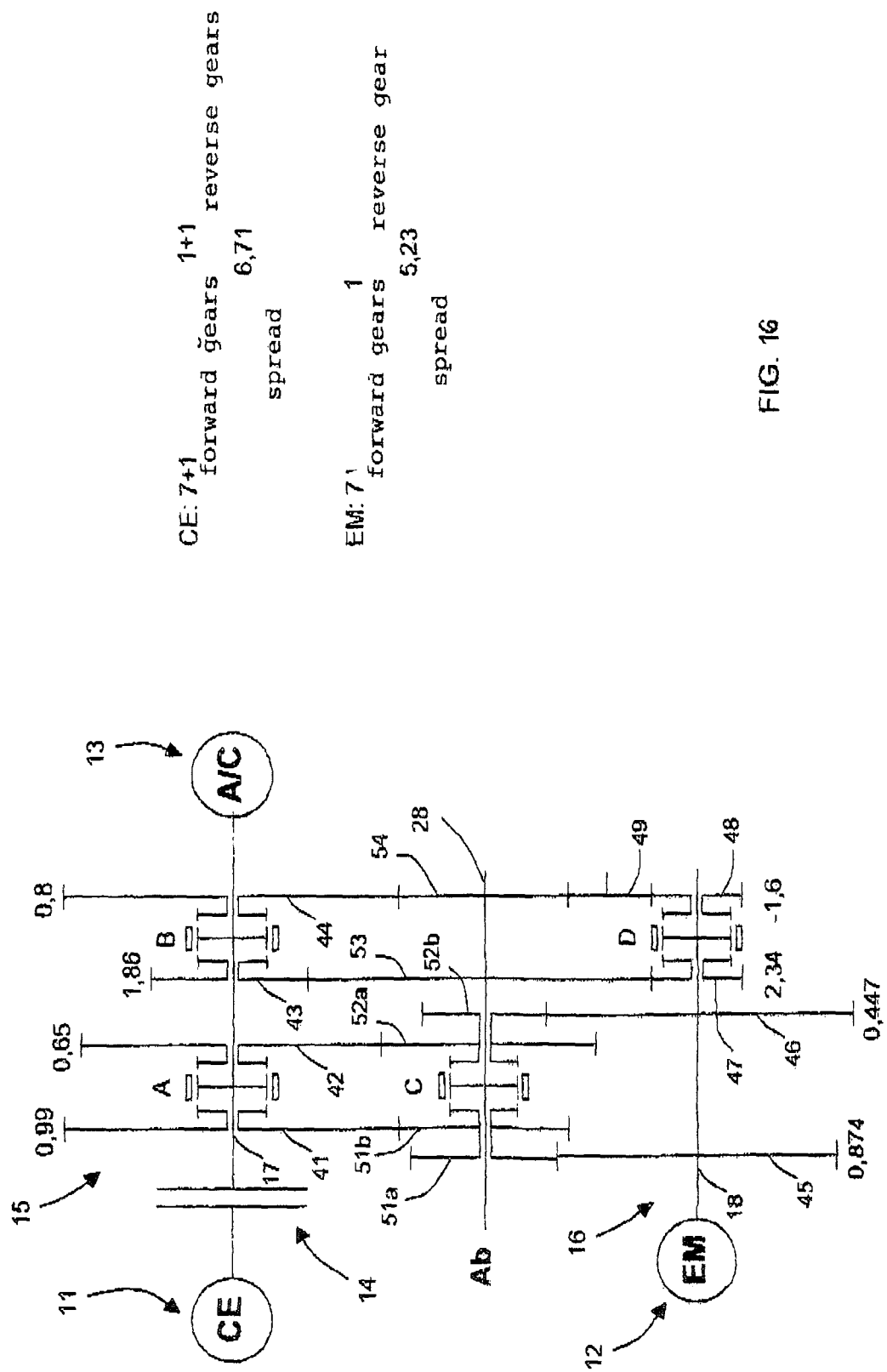
FIG. 16 shows the kinematic diagram of an inventive hybrid drive system in a third modified embodiment in neutral position.

FIG. 16 shows a modified embodiment of the transmission according to FIG. 1, wherein here too all switching elements A, B, C, D are represented in the neutral position. In the embodiment shown here, in derogation from the preceding representations, the gearwheels are represented with true size ratios, in order to represent the different desired transmission ratios of the individual gear pairings, which are specified as numerical values. In this connection the gearwheels 51 and 52, which form the shift gears on the output shaft, are constructed as sliding gears 51a, 51b, 52a, 52b, said sliding gears being engaged with respective different gearwheel sizes with the wheels 41, 42 of the first sub-transmission 15 for one thing and the wheels 45, 46 of the second sub-transmission 16 for another thing.

In this configuration the drive of the internal combustion engine 11 can take place via eight forward gears and two reverse gears in the case of a spread of 6.71, while the drive of the electric machine 12 can take place via seven forward gears and one reverse gear, in the case of a spread of 5.23.

Figure 17:
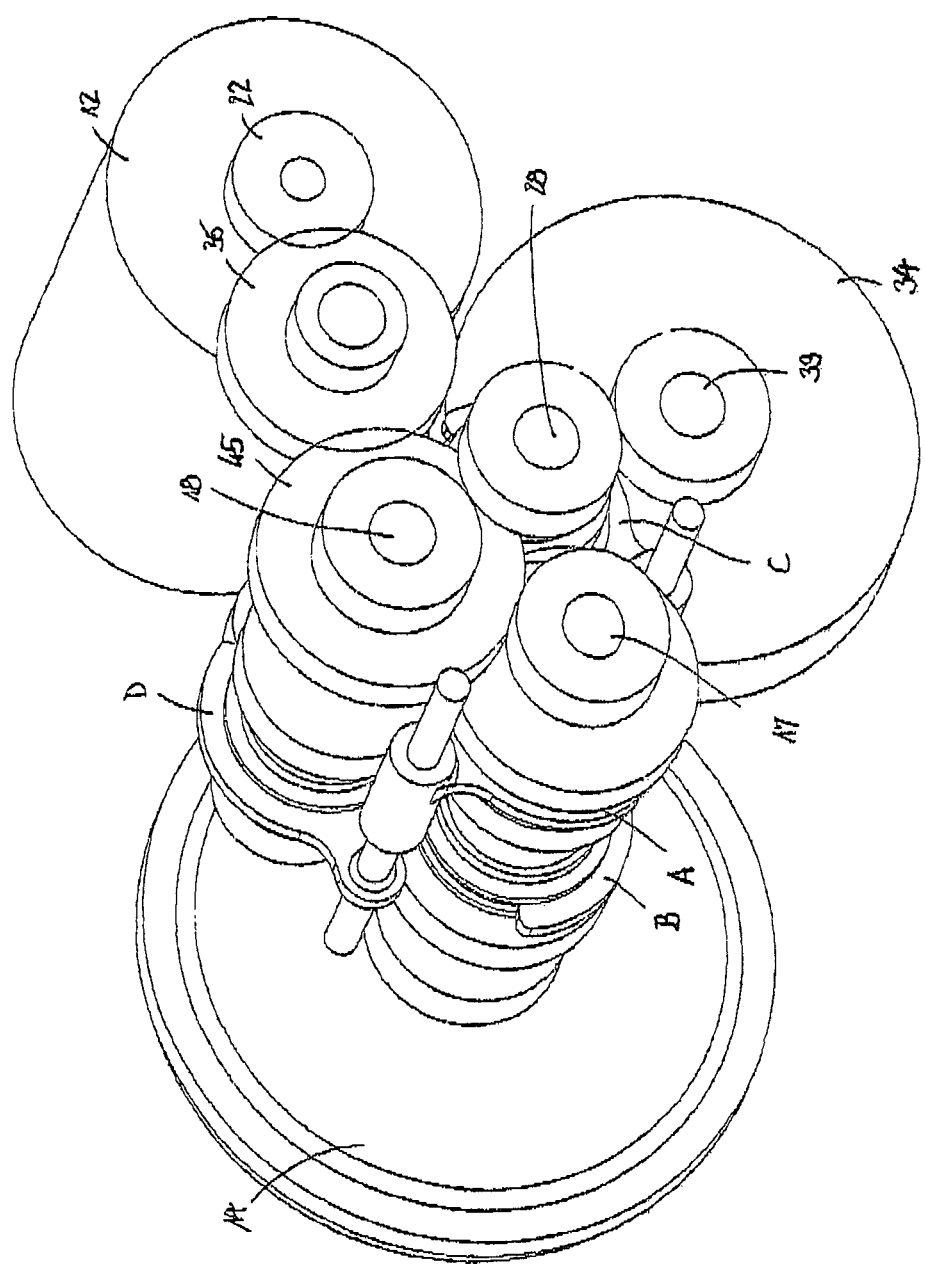
FIG. 17 shows a spatial representation of an inventive hybrid drive system in a fourth modified embodiment.

FIG. 17 shows the spatial arrangement of the transmission in a once more modified embodiment. The first input shaft 17, the second input shaft 18 and the output shaft 28 can be recognized in their spatial arrangement stretching over a triangle in cross-section, likewise the two shifting units A, B on the first input shaft 17, the shifting unit D on the second input shaft 18 as well as the shifting unit C on the output shaft 28. The flywheel and the clutch 14 of the internal combustion engine are in this connection arranged coaxially to the first input shaft 17. On the other hand the electric machine 12 is directly drive-connected to the gearwheel 45 and with this to the second input shaft 18 in fixed transmission ratio via a gearwheel 22 and an intermediate gear 35. Finally the output shaft 28 acts on the gearwheel 34 via a gearwheel not shown in the figure, said gearwheel being directly seated on the differential 39 of the output.

Figure 18:
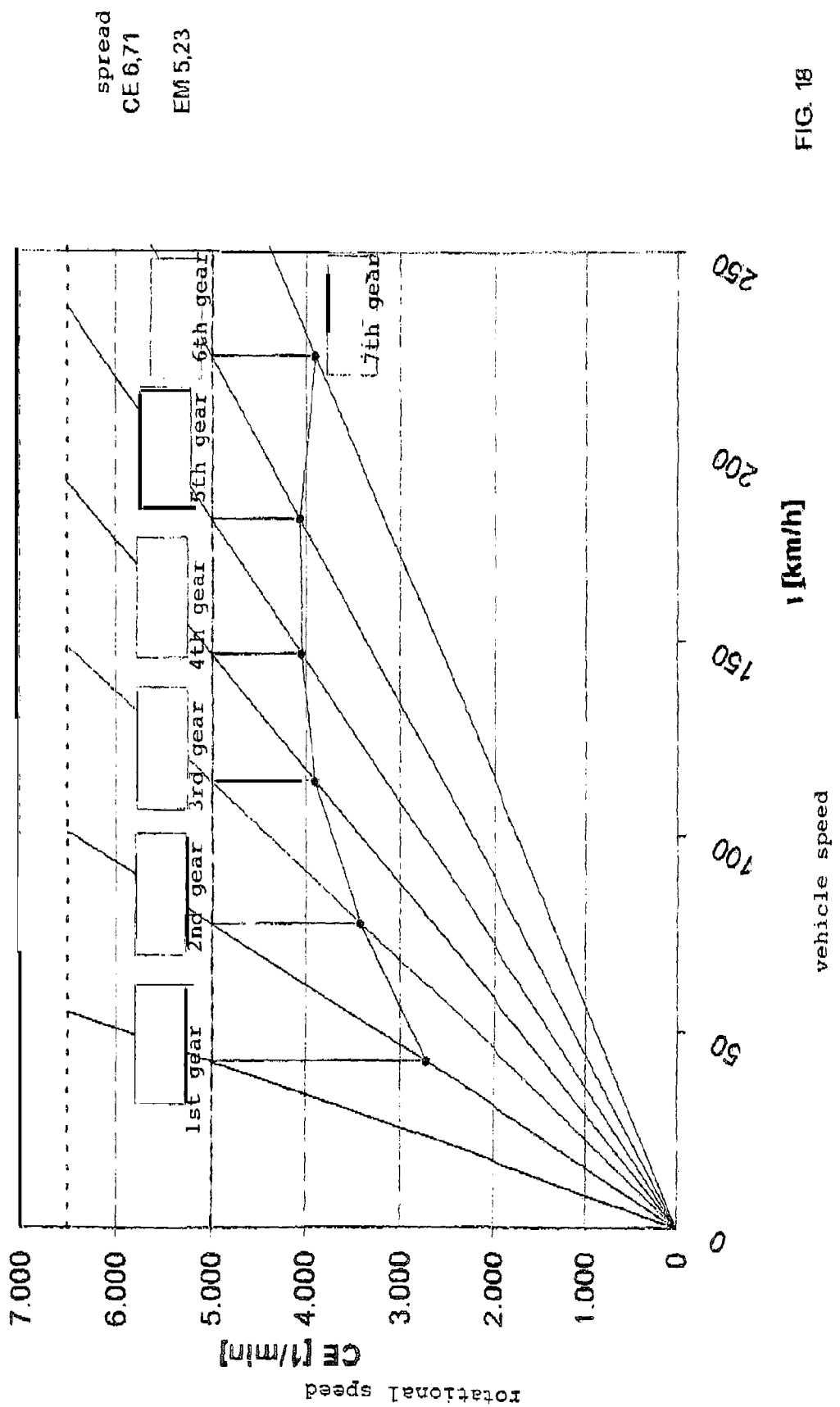
FIG. 18 shows a transmission diagram taking the different gear steps into consideration.

FIG. 18 shows a diagram in which the speed of the internal combustion engine is represented via the motor vehicle speed with the transmission ratios of the individual gear steps. A spread of 6.71 arises for the internal combustion engine and a spread of 5.23 arises for the electric machine.

Figure 19:
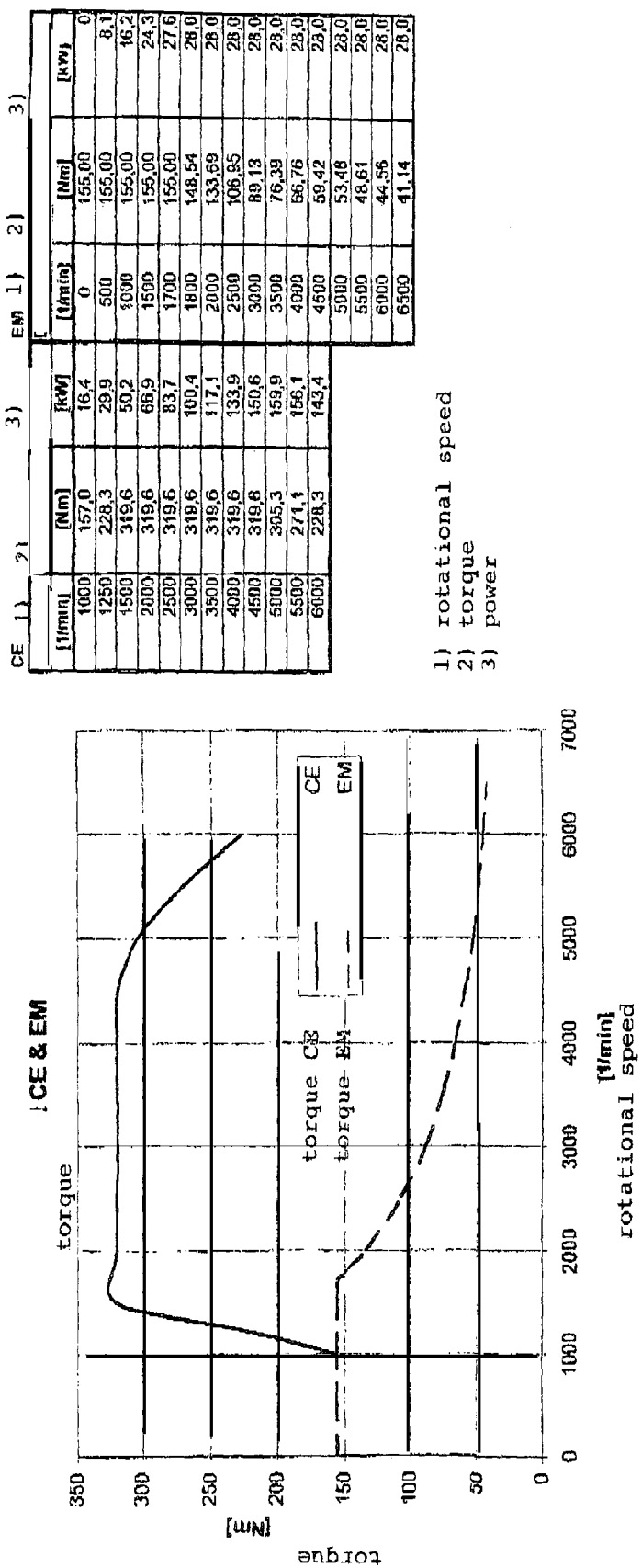
FIG. 19 shows the torque curves of the two drive machines at their speed.

FIG. 19 represents the torque curves of the internal combustion engine and the electric machine via the respective machine speed both graphically in a diagram as well as also with numerical values in a table. The table and the diagram are equivalent.

FIG. 20 shows the machine speeds and the wheel torques via the speed of the motor vehicle. In addition the road resistance is represented via the speed of the motor vehicle.

The alternate shifting of the drive machines 11, 12 becomes recognizable.

The invention is not restricted to the illustrative examples or embodiments described above. The examples or embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A hybrid drive system comprising a first drive machine (11), in particular an internal combustion engine, and a second drive machine (12), in particular an electric engine, for a motor vehicle, comprising:
    a first gearshift sub-transmission (15) having a first input shaft (17) that can be coupled to an output shaft (28) by means of a first group of shifting gearwheel pairs (41/51, 42/52, 43/53, 44/54), wherein the first input shaft (17) can be coupled to the first drive machine (11), a second gearshift sub-transmission (16) having a second input shaft (18) that can be coupled to the output shaft (28) by means of a second group of shifting gearwheel pairs (45/51, 46/52, 47/53, 48/54), wherein the second input shaft (18) is in a drive connection with the second drive machine (12),
    characterized in that
    at least two shifting gearwheel pairs (41/51, 42/52) of the groups of shifting gearwheel pairs are formed by exclusively engaging and disengaging idler gears in the first gearshift sub-transmission (15) that are arranged on the first input shaft (17) and the output shaft (28).

2. The hybrid drive system according to claim 1, characterized in that
on the first input shaft (17) exclusively engaging and disengaging idler gears (41, 42, 43, 44) are provided.

3. The hybrid drive system according to claim 1, characterized in that
in the second gearshift sub-transmission (16) exclusively shifting gearwheel pairs from one fixed gear connected to its shaft and one engaging and disengaging idler gear connected to its shaft are provided.

4. The hybrid drive system according to claim 3, characterized in that
in the second gearshift sub-transmission (16) two engaging and disengaging idler gears (47, 48) are arranged on the second input shaft (18) and two engaging and disengaging idler gears (51, 52) are arranged on the output shaft (28).

5. The hybrid drive system according claim 1, characterized in that
the first drive machine (11) can be coupled to the first input shaft (17) via a friction clutch (14).

6. The hybrid drive system according to claim 1, characterized in that
the second drive machine (12) is arranged directly on the second input shaft (18).

7. The hybrid drive system according to claim 1, characterized in that
an auxiliary drive machine (13), in particular an air conditioner compressor is arranged on one of the input shafts (17, 18).

8. The hybrid drive system according to claim 1, characterized in that
the second drive machine (12) is drive-connected to the second input shaft (18) via a transmission step (22/32) or a chain or belt drive.

9. The hybrid drive system according to claim 1, characterized in that
an auxiliary drive machine (13), in particular an air conditioner compressor is drive-connected to one of the input shafts (17, 18) via a transmission step (23/33) or a chain or belt drive.

10. The hybrid drive system according to claim 1, characterized in that
the two input shafts (17, 18) and the output shaft (28) are in parallel arrangement to one another.

11. The hybrid drive system according to claim 1, characterized in that
one of the gearshift sub-transmissions (15, 16) comprises a reverse gear.

* * * * *